United States Patent
Adenot et al.

(10) Patent No.: US 9,447,887 B2
(45) Date of Patent: Sep. 20, 2016

(54) FLUID CIRCULATION VALVE WITH IMPROVED SEAL

(75) Inventors: Sébastien Adenot, Pontoise (FR); Grégory Hodebourg, Sartrouville (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 150 days.

(21) Appl. No.: 13/703,380

(22) PCT Filed: Jun. 27, 2011

(86) PCT No.: PCT/FR2011/051485
§ 371 (c)(1),
(2), (4) Date: Mar. 8, 2013

(87) PCT Pub. No.: WO2012/001282
PCT Pub. Date: Jan. 5, 2012

(65) Prior Publication Data
US 2013/0153804 A1 Jun. 20, 2013

(30) Foreign Application Priority Data
Jun. 30, 2010 (FR) .................................... 10 02777

(51) Int. Cl.
*F16K 1/22* (2006.01)
*F16K 1/226* (2006.01)
(Continued)

(52) U.S. Cl.
CPC .............. *F16K 1/22* (2013.01); *F02D 9/1025* (2013.01); *F02M 26/16* (2016.02); *F16K 1/2263* (2013.01); *F16K 27/0218* (2013.01); *Y02T 10/121* (2013.01); *Y10T 137/86847* (2015.04)

(58) Field of Classification Search
CPC ...... F16K 1/222; F16K 1/226; F16K 1/2263; F16K 27/0218; F02D 9/1045; F02M 25/0793; Y10T 137/87708; Y10T 137/87788; Y10T 137/87909; Y10T 137/87812; Y10T 137/8782; Y10T 137/86847; Y10T 137/6579
USPC ......... 251/305, 306, 314; 123/337; 137/862, 137/872, 875–876, 887, 625.44, 340; 60/320
See application file for complete search history.

(56) References Cited

U.S. PATENT DOCUMENTS

| | | | | |
|---|---|---|---|---|
| 4,213,595 A | * | 7/1980 | Sheppard ........... | B60H 1/00485 251/308 |
| 6,722,335 B2 | * | 4/2004 | Nomura et al. ......... | 123/184.59 |

(Continued)

FOREIGN PATENT DOCUMENTS

| | | |
|---|---|---|
| DE | 24 27 995 A1 | 1/1976 |
| DE | 199 36 457 A1 | 2/2001 |

(Continued)

OTHER PUBLICATIONS

International Search Report issued in PCT/FR2011/051485 mailed Oct. 17, 2011 (4 pages).
(Continued)

*Primary Examiner* — Michael R Reid
(74) *Attorney, Agent, or Firm* — Osha Liang LLP

(57) ABSTRACT

The invention relates to a fluid valve comprising a movable flap (1) provided with a first wing (3) and a second wing (4), said valve also including a gasket (2) having an opening (5) for the passage of the fluid. At least one (3) of the aforementioned wings, known as the sealing wing, can seal the opening (5) in the gasket (2) at least partially when the flap (1) is in the closed position. According to the invention, the sealing wing (3) and the other wing (4) are positioned on each side of the gasket (2) when the flap is in the closed position and the flap comprises an intermediate area (6) connecting the first (3) and second (4) wings and extending through the opening in the gasket (6).

15 Claims, 4 Drawing Sheets

(51) Int. Cl.
*F16K 27/02* (2006.01)
*F02D 9/10* (2006.01)
*F02M 26/16* (2016.01)

(56) References Cited

U.S. PATENT DOCUMENTS

| | | | |
|---|---|---|---|
| 7,137,614 B2* | 11/2006 | Masui et al. | 251/129.11 |
| 7,296,585 B2* | 11/2007 | Eggleston et al. | 137/15.25 |
| 7,416,164 B2* | 8/2008 | Eggleston et al. | 251/174 |
| 8,627,806 B2* | 1/2014 | Festor | F16K 1/2263 123/41.4 |
| 2008/0296525 A1* | 12/2008 | Albert | 251/129.11 |
| 2009/0235654 A1* | 9/2009 | Kobayashi et al. | 60/320 |
| 2010/0148107 A1* | 6/2010 | Keller-Staub | 251/306 |
| 2012/0298900 A1* | 11/2012 | Brinks et al. | 251/305 |

FOREIGN PATENT DOCUMENTS

| | | | | |
|---|---|---|---|---|
| FR | 2 933 469 A1 | 1/2010 | | |
| FR | WO 2010000752 A1 * | 1/2010 | | F02M 25/0719 |
| WO | 2009/151681 A2 | 12/2009 | | |

OTHER PUBLICATIONS

Office Action in counterpart Chinese Patent Application No. 201180041518.4 issued Dec. 3, 2013 (19 pages).

\* cited by examiner

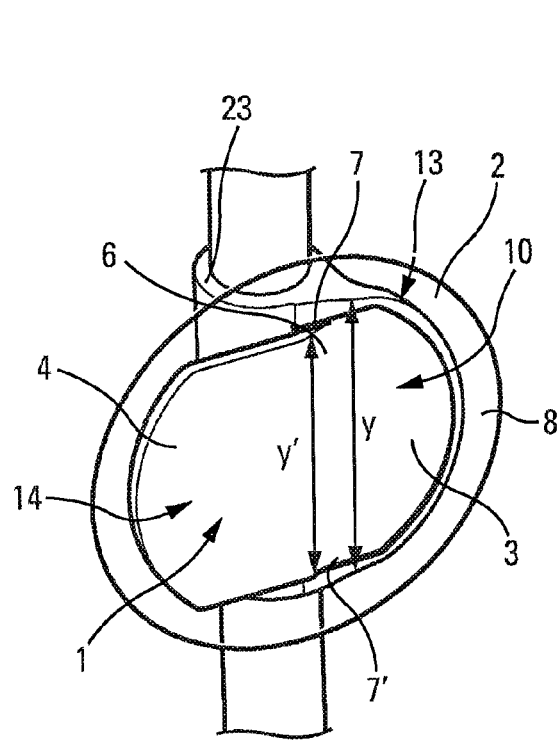
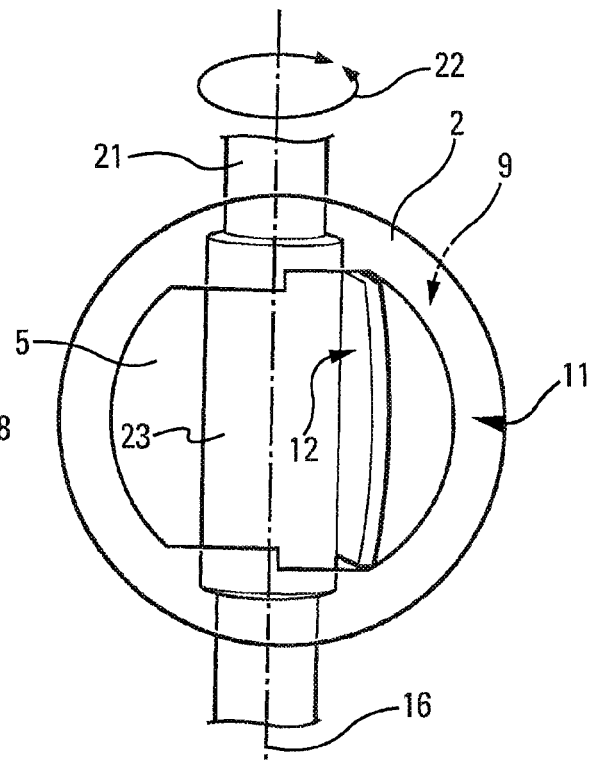
Fig. 5   Fig. 6
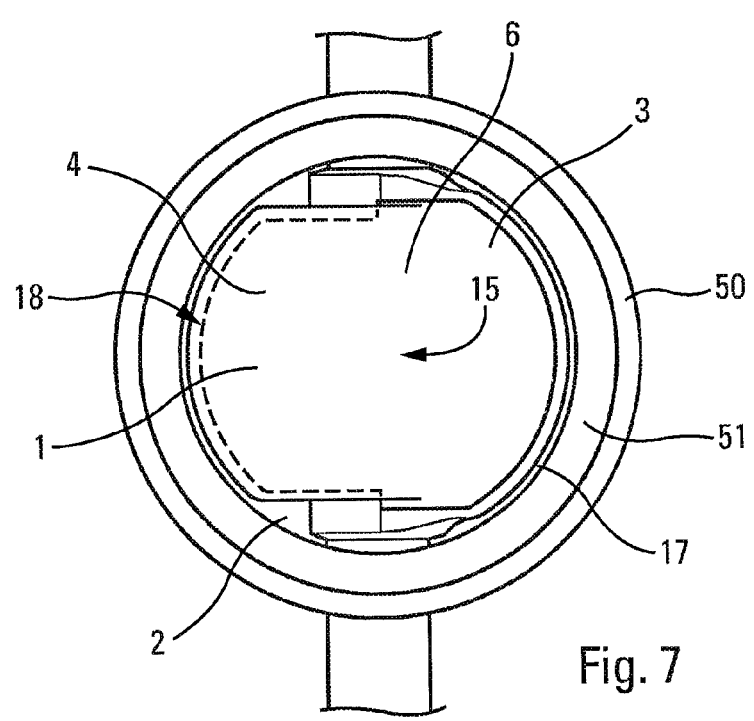
Fig. 7

FLUID CIRCULATION VALVE WITH IMPROVED SEAL

BACKGROUND

The present invention relates to a valve for the circulation of fluid. This fluid may notably be exhaust gas from a motor vehicle engine, fresh air bound for the intake side of the engine or a mixture of fresh air and exhaust gases.

Said valve may thus be used to regulate the flow rate of exhaust gas intended to be recirculated to the engine air intake line. In particular, it may be used in engine designs, notably diesel engine designs involving a turbocompressor, said valve being provided on the engine exhaust line downstream of the turbocompressor turbine in order to bleed off some of the gases. It may also be used as a metering valve by being sited along the air intake line or the exhaust gas recirculation line.

A valve comprising a mobile flap and a seal is already known at the present time. Said seal has an opening for the passage of the fluid, said opening being shut off by the flap when the latter is in a closed position.

The fluidtightness of the closure is afforded by flexible tabs protruding from the seal and against which a planar surface of the flap bears in the closed position. However, in order to allow the flap its travel, the tabs are interrupted in the region of the axis about which the flap is articulated, thus impairing sealing.

It is an object of the present invention to redress these problems and the present invention for that reason proposes a fluid circulation valve comprising a mobile flap equipped with a first wing and with a second wing, said valve also comprising a seal, said seal having an opening for the passage of the fluid, at least one of said wings, referred to as the shutoff wing, being able, at least in part, to shut off said opening in the seal when the flap is in a closed position.

According to the invention, said shutoff wing and the other of said wings are provided one on either side of the seal when the flap is in the closed position and said flap comprises an intermediate zone connecting said first wing and said second wing, that passes through said opening in the seal.

Sealing can thus be available along the periphery of the opening in the seal, via the wing or wings which can come to bear against surfaces of the seal, around the periphery of said opening, without impeding the travel of the flap. As for the sealing in the region of the intermediate zone, that can be enhanced by the intermediate zone itself which, by passing right through said opening, may allow flush contact with the seal in the region of said opening.

SUMMARY

According to various embodiments:
said seal comprises a planar zone having a surface against which said shutoff wing comes to bear via one of its faces, designed to be planar and referred to as the bearing face of the shutoff wing, and/or an opposite surface against which the other wing of the flap comes to bear, via one of its faces, designed to be planar and referred to as the bearing face of the other wing, when the flap is in the closed position, said opening for the passage of the fluid and provided in the seal being positioned in the region of said planar zone,
said bearing surface of the shutoff wing and said bearing surface of the other wing of the flap extend in two parallel planes distant from one another,
said planes are distant by a dimension corresponding to the thickness of the seal in said planar zone,
the other wing of the flap has a surface on the opposite side to its planar bearing surface, and the intermediate zone has an inclined plane between the bearing face of the shutoff wing and said opposite face,
the valve comprises, near the intermediate zone of the flap, an axis about which the flap is articulated, which is off-centered with respect to said flap, and, in the direction of the axis of articulation of the flap, said shutoff wing has a dimension extending on either side beyond the dimension by which the intermediate zone extends, at least in the region of a zone of connection between said intermediate zone and said shutoff wing,
said seal has a boss along a part of the passage opening which part is provided facing the other wing of the flap when this flap is in the closed position, said boss being configured to be compressed by said other wing of the flap when this flap is in the closed position.

In a first embodiment, the seal and the flap defined hereinabove can be used in a valve comprising a body defining a main duct and an auxiliary duct for the flow of the fluid, opening into said main duct, said flap being designed to be able to move between the closed position, designed to prevent communication between the two ducts, and an open position that allows communication between said ducts at a fluid passage aperture, said opening in the seal allowing fluid to pass from one duct to the other.

Said first wing for example makes it possible to close said passage aperture when the flap is in the closed position, and said second wing makes it possible to close said first duct at least partially when the flap is in the open position, said first wing being said shutoff wing and said second wing being said other wing.

Said seal may notably have a blind zone situated facing said other wing when the flap is in the closed position.

Said body, for example, comprises a housing for a flap actuating motor, said body being configured to define an air gap between said blind zone and said housing.

In a second embodiment, the seal and the flap as defined hereinabove can be used in a valve comprising a body defining a fluid flow duct, said flap being designed to be able to move between said closed position designed to prevent the circulation of fluid in the duct, and an open position allowing fluid to circulate in the duct, said seal being designed to be positioned transversely to said duct so that said opening in the seal allows fluid to pass along the duct when the flap is in the open position.

Said opening, for example, extends facing the shutoff wing and said other wing when the flap is in the closed position.

The seal is held in said body notably by means of a sleeve.

The invention will be better understood from studying the following description given merely by way of entirely nonlimiting example and accompanied by the attached drawings in which:

BRIEF DESCRIPTION OF DRAWINGS

FIG. 5 is a perspective illustration of a seal and a flap intended to be mounted in a valve according to a second embodiment of the invention, the seal being depicted transparently to show hidden detail, the flap being in the closed position, FIG. 6 repeats FIG. 5 but with the flap in the open position, FIG. 7 is a schematic illustration in side view of the valve in which the seal and the flap of FIGS. 5 and 6 are mounted.

DETAILED DESCRIPTION

Figure 1:
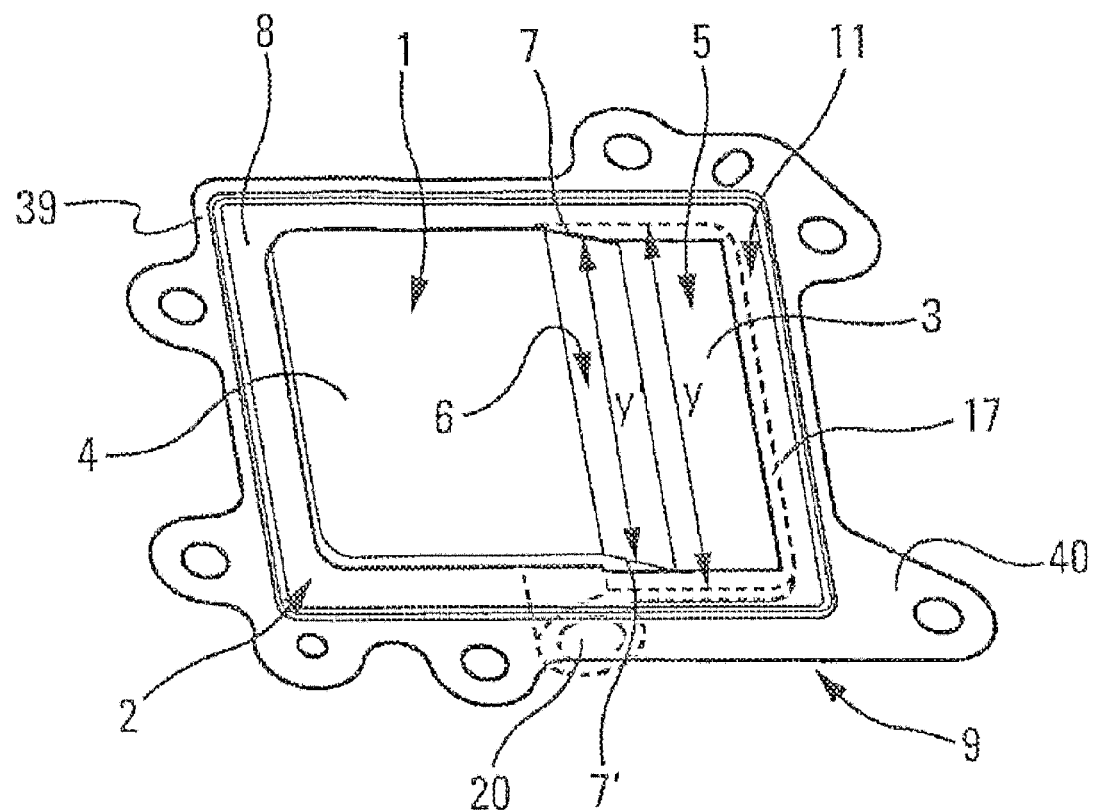
FIG. 1 is a perspective illustration of a seal and of a flap intended to be mounted in the valve according to a first embodiment of the invention, the seal being depicted as transparent to show hidden detail, the flap being in the closed position.

As illustrated in FIGS. 1 and 2 and 5 and 6, the invention relates to a valve for the circulation of fluid, comprising a mobile flap 1 and a seal 2. The flap 1 is provided with a first wing 3 and with a second wing 4. The seal 2 has an opening 5 for the passage of the fluid.

Figure 2:
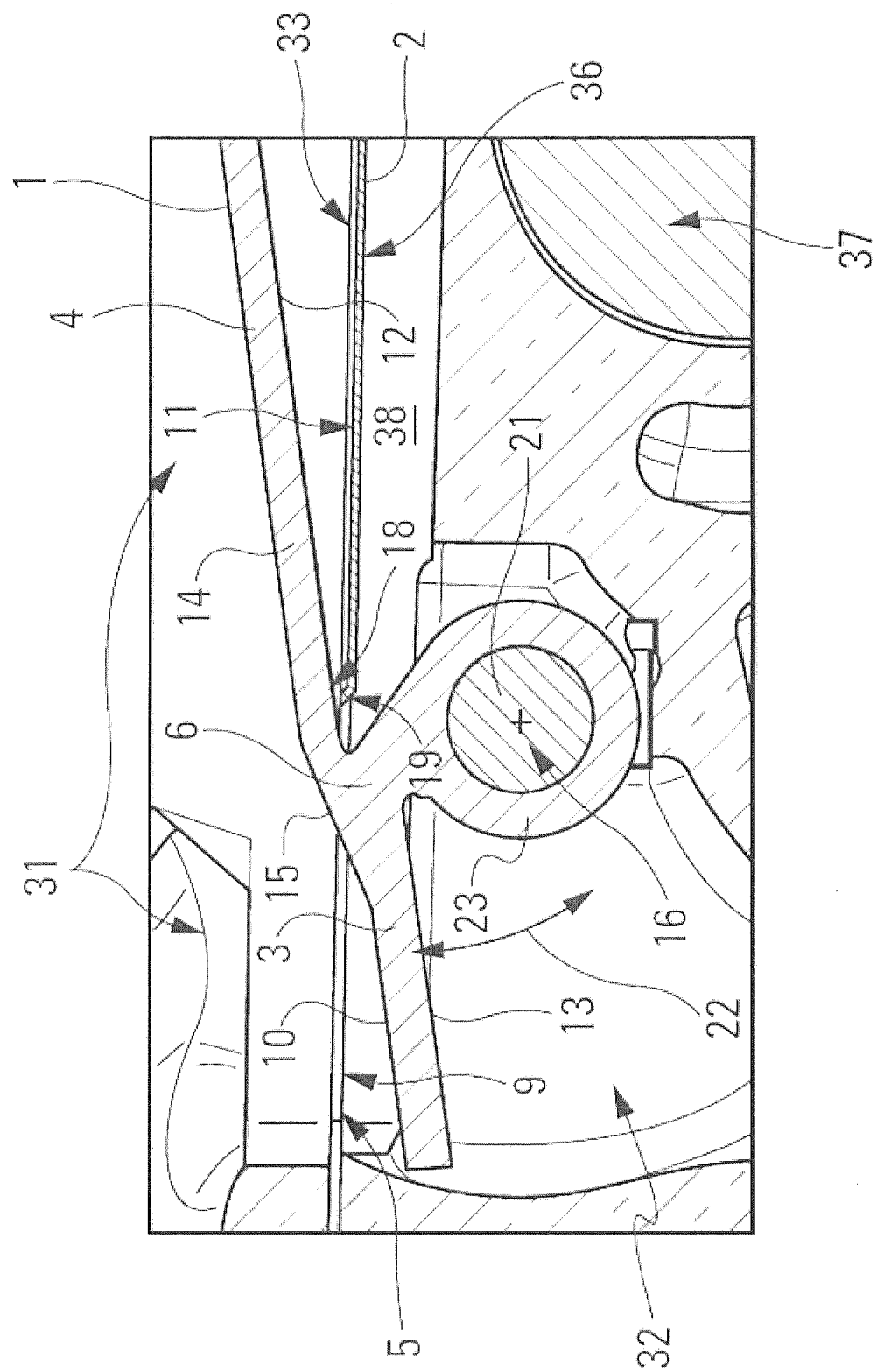
FIG. 2 is a view in section, taken on a plane of section orthogonal to the axis of articulation of the flap, illustrating the seal and the flap of FIG. 1, mounted in their valve, with the flap in the partially open position.

At least one 3 of said wings, referred to as the shutoff wing, is able at least partially to shut off said opening 5 in the seal, when the flap is in a closed position. In the embodiment of FIGS. 1 and 2, the shutoff wing 3 alone is enough to close said opening 5 in the seal. In the embodiment of FIGS. 5 and 6, the other wing 4 also contributes to shutting off said opening 5 in the seal, when the flap 1 is in the closed position.

When the flap is in an open position, said first wing 3 and said second wing 4 extend one on one side and the other on the other side of the seal 2, transversely thereto in order to allow the fluid to pass.

In the embodiment of FIGS. 1 and 2, the flap 1 is inclined with respect to the seal 2 in its wide-open position, not depicted.

In the embodiment of FIGS. 5 and 6, the flap 1 is orthogonal to the seal 2 in its wide-open position.

According to the invention, said shutoff wing 3 and the other 4 of said wings are provided one on each side of the seal 2 when the flap is in the closed position, and said flap 2 comprises an intermediate zone 6 connecting said first wing 3 and said second wing 4 and passing through said opening in the seal, for example in a flush manner, at zones 7, 7' of the contour of said opening 5 in the seal.

It is thus possible to achieve sealing around the opening 5 in the seal while at the same time allowing the flap to move between its open position and its closed position without the need to leave significant clearances between the opening in the seal and the contour of the flap.

According to the various embodiments illustrated, said seal 2 comprises a planar zone 8 having a surface 9 against which said shutoff wing 3 comes to bear via one 10 of its faces, designed to be planar and referred to as the bearing face of the shutoff wing, and/or an opposite surface 11 against which the other wing 4 of the flap comes to bear, via one 12 of its faces, designed to be planar and referred to as the bearing face of the other wing, when the flap is in the closed position. Said fluid passage opening 5 provided in the seal 2 is positioned in the region of said planar zone 8. Sealing is thus achieved by face-to-face contact in the region of the said wing or wings.

Said bearing surface 10 of the shutoff wing and said bearing surface 12 of the other wing of the flap extend for example in two parallel planes distant from one another, for example, by a dimension corresponding to the thickness of the seal in said planar zone 8. Contacts of the plane-to-plane type can thus be ensured.

The shutoff wing 3 has a surface 13, on the opposite side to its bearing surface 10, and the other wing 4 has a surface 14, on the opposite side to its bearing surface 12. These two opposite faces 13, 14 are, for example, planar and the intermediate zone 6 has an inclined plane 15 between the bearing face 10 of the shutoff wing 3 and said opposite face 14 of the other wing 4. This then encourages fluid to flow at the surface of the flap.

According to the embodiments illustrated, the valve comprises an axis of articulation for the flap 1, which is off-centered with respect to said flap 1 and situated, for example, near the intermediate zone 6 of the flap.

In the direction of the axis about which the flap is articulated, said shutoff wing has a dimension y extending on either side beyond the dimension y' by which the intermediate zone 6 extends, at least in the region of a zone of connection between said intermediate zone and said shutoff wing 3. The bearing surface 10 of the shutoff wing 3 may thus have a zone 17 of contact, in the form of an angular portion of an annulus, with the seal 2 on a first part of the periphery of the opening 5 in the seal, on one side of said seal, while the bearing surface 12 of the other wing 4 has, on the other side of the seal, a zone 18 of contact on a complementary part of the periphery of the opening 5 in the seal.

According to the embodiments illustrated, the zone of contact 17 offered by the shutoff wing 3 also extends in line with the intermediate zone 6, in the region of the zones 7, 7'. This then enhances fluid-tightness and it is possible to have an intermediate zone 6 which does not lie flush with the contour of the opening 5 in the seal.

As illustrated more particularly in FIG. 2, said seal has a boss 19 along part of the opening 5 in the seal, provided facing the other wing 4 of the flap when the latter is in the closed position. Said boss is configured to be compressed by said other wing 4 of the flap when the latter is in the closed position. This further improves sealing.

The flap 1 for example has a housing 20 for a pivot shaft 21. This in particular is a rotational articulation about the axis of articulation 16, as illustrated in the drawings by the arrows identified as 22. Said housing for example is in an extension 23 of the intermediate zone 6, extending from the opposite face 13 to the bearing face 10 of the shutoff wing and from the bearing face 12 of the other wing 4 of the flap.

The housing 20 here is a through-housing and the shaft 21 emerges on either side of the housing 20. The shaft 21 is connected to the extension 23 in a way known per se.

The shutoff wing 3, the other wing 4, the intermediate zone 6 and its extension 23 form, for example, a single component, notably a casting.

As has been illustrated in FIGS. 1 and 2, without that being restricted to the embodiment discussed, the opening 5 of the flap has a substantially rectangular outline, as does the shutoff flap 3. Further, the zone of contact of said shutoff wing 3 extends along three of the sides of said opening. As for the zone 18 of contact, that extends along the last side. Said intermediate zone is provided facing the contour of said opening 5 over part of two of its opposite sides. The zone 17 of contact of the shutoff wing 3 is extended in line with said intermediate part 6, in the region of the zones 7, 7'. Said other flap 4 may likewise be rectangular.

As illustrated in FIGS. 5 and 6, and without this being restricted to the embodiment discussed here, the opening 5 consists of two rectangles, provided side-by-side, one of the two rectangles having a dimension, along the axis of articulation of the flap, that is shorter than the other, each of said rectangles here being extended by a portion of a disk. Said other wing 4 has a rectangular shape, here extended by a portion of a disk, shutting off that part of the opening 5 that comprises the smallest rectangular part while the shutoff wing 3 has a rectangular shape, here extended by a portion of a disk, which shuts off that part of the opening that has the larger rectangular part. Said other wing 4 extends beyond the opening 5 so that the corresponding contact zone 18 follows the edges of the opening 5 in the seal that lie along the sides of the smaller rectangular part of the opening 5, running perpendicular to the axis of rotation, and along the disk-portion-shaped part that extends it. Said shutoff wing 3 extends beyond the opening 5 so that the corresponding contact zone 17 follows the edges of the opening 5 that lie along the sides of the larger rectangular part of the opening 5, running perpendicular to the axis of rotation, and along the disk-shaped part that extends it. Said intermediate zone 6 is provided facing the contour of said opening 5 on part of two of the opposite sides of the larger rectangular part of which it is made. As in the other embodiment, the contact zone 17 of the shutoff wing 3 is extended in line with said intermediate part 6, in the region of the zones 7, 7'. Thus sealing is enhanced.

Figure 3:
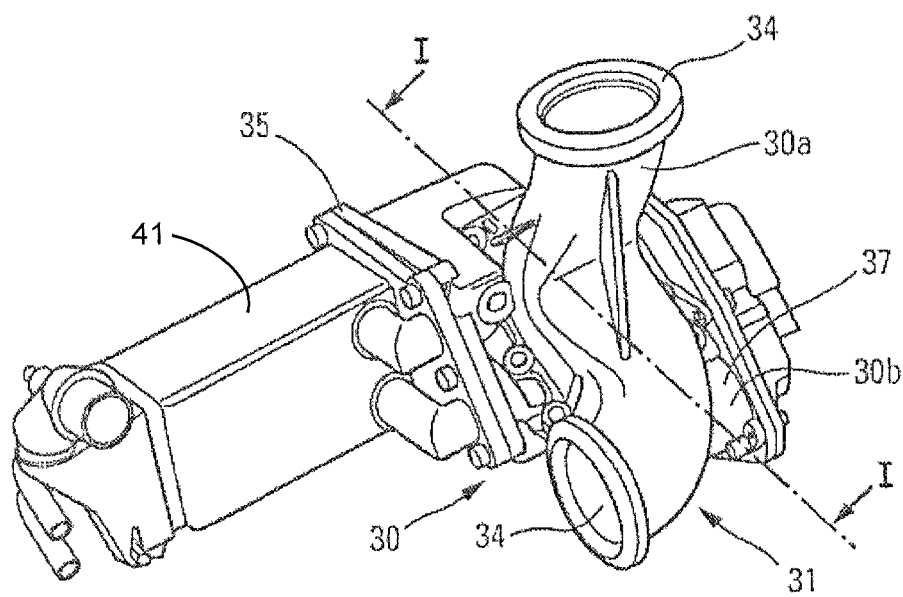
FIG. 3 is a perspective illustration of the valve in which the seal and the flap of FIGS. 1 and 2 are mounted, said valve being attached to a heat exchanger 41.
Figure 4:
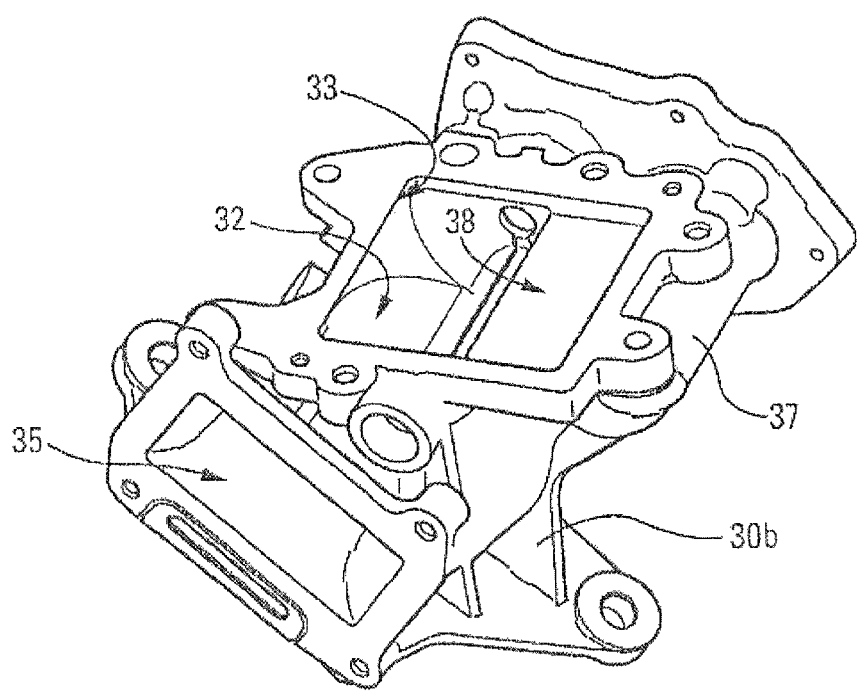
FIG. 4 is a perspective illustration of part of the valve of FIG. 3.

Returning now to the embodiment of FIGS. 1 and 2, that will find more particular application in a valve like the one illustrated in FIGS. 3 and 4.

That valve comprises a body 30 defining a main duct 31 and an auxiliary duct 32 for the flow of fluid, opening into said main duct 31. Said flap 1 is designed to be able to move between the closed position designed to prevent communication between the two ducts 31, 32, and an open position, allowing communication between said ducts 31, 32 in the region of a fluid passage aperture 33, said opening 5 in the seal allowing fluid to pass from one duct 31 to the other 32. Said opening 5 in the seal is thus provided facing the aperture 33 in the body 30.

Said first wing 3 makes it possible to close said passage aperture 33 when the flap is in the closed position, and said second wing 4 makes it possible at least partially to close said first duct 31, when the flap is in the open position, said first wing being said shutoff wing.

The main duct for example has inlet and outlet orifices 34 communicating, in one application example, with the exhaust line of an engine. The auxiliary duct has an orifice 35 communicating, in the same application example, with an exhaust gas recirculation line.

Said body may be produced in two parts 30a, 30b, each part defining one of said ducts and having an opening which align in order to define said aperture 33. Said seal also acts as a seal between said two parts 30a, 30b with respect to the outside of the valve.

According to such an embodiment, said seal has a blind zone 36 situated facing said other wing 4 when the flap 1 is in the closed position. In other words, as already explained above, the opening 5 in the seal is provided only in the region of the shutoff wing 3, the flap 1 being in the closed position.

Said body 30 further comprises, for example, a housing 37 for a flap actuating motor. Said valve may for this reason comprise a transmission system, not depicted, providing transmission between an output shaft of the motor and the shaft about which the flap is articulated.

Said body 30 may also be configured to define an air gap 38 between said blind zone 36 of the seal and said housing 37. Thermal insulation of the motor is thus improved.

The seal 2 for example has a peripheral part 39 and said planar zone 8 is situated set back from the peripheral part. Such a seal is obtained, for example, by pressing. Said peripheral part 39 may have extensions 40 acting as flanges for attachment to the body 30.

Said extension 23 of the flap accommodating its pivot shaft 21 is located in such a way as to close said fluid gap 38. Said body 30 has, for example in the region of the part 30b defining the auxiliary duct 32, housings for the shaft 21 about which the flap is articulated.

According to the embodiment illustrated in FIGS. 5 to 7, the valve comprises a body 50 defining a fluid flow duct. Said flap 1 is designed to be able to move between said closed position, designed to prevent circulation of fluid through the duct, and an open position that allows fluid to circulate in the duct. Said seal 2 is designed to be positioned transversely to said duct so that said opening 5 in the seal 2 allows the fluid to pass along the duct when the flap is in the open position.

As has already been mentioned, said opening 5 in the seal extends facing the shutoff wing 3 and said other wing 4 when the flap is in the closed position.

The seal 2 is held in said body by means of a sleeve 51.

The invention claimed is:

1. A fluid circulation valve comprising:
   a mobile flap equipped with a first wing and with a second wing, wherein one of the first wing or the second wing is referred to as the shutoff wing, and the other of the first wing or the second wing is referred to as the other wing; and
   a single seal, said single seal having an opening for the passage of the fluid,
   wherein the shutoff wing is configured, at least in part, to shut off said opening in the single seal when the mobile flap is in a closed position,
   wherein said shutoff wing is provided on one side of the single seal and said other wing is provided on the other side of the single seal when the mobile flap is in the closed position,
   wherein said mobile flap comprises an intermediate zone connecting said first wing and said second wing,
   wherein the intermediate zone passes through said opening in the single seal,
   wherein said single seal comprises a planar zone, the planar zone of the single seal comprising:
   a surface against which a planar bearing face of said shutoff wing comes to bear when the mobile flap is in the closed position; and
   an opposite surface against which a planar bearing face of the other wing comes to bear when the mobile flap is in the closed position,
   wherein said opening for the passage of the fluid provided in the single seal is positioned in the region of said planar zone,
   wherein said bearing face of the shutoff wing and said bearing face of the other wing extend in two parallel planes distant from one another by a dimension corresponding to the thickness of only the single seal in said planar zone,
   wherein the mobile flap rotates about a pivot shaft, and
   wherein the parallel planes of the bearing face of the shutoff wing and the bearing face of the other wing do not intersect the shaft.

2. The valve as claimed in claim 1, wherein the other wing of the mobile flap has a surface on the opposite side to the corresponding planar bearing face, the intermediate zone has an inclined plane, and the inclined plane extends from the bearing face of the shutoff wing to the surface on the opposite side to the planar bearing face of the other wing such that the inclined plane directly connects the shutoff wing to the other wing.

3. The valve as claimed in claim 1, further comprising, near the intermediate zone of the mobile flap, an axis about which the mobile flap is articulated, which is off-centered with respect to said flap, and in which valve, in a direction of the axis of articulation of the mobile flap, said shutoff wing has a dimension extending on either side beyond the dimension by which the intermediate zone extends, at least in the region of a zone of connection between said intermediate zone and said shutoff wing.

4. The valve as claimed in claim 1, wherein said single seal has a boss along a part of the passage opening which part is provided facing the other wing of the mobile flap when the mobile flap is in the closed position, said boss being configured to be compressed by said other wing when the mobile flap is in the closed position.

5. The valve as claimed claim 1, further comprising a body defining a main duct and an auxiliary duct for the flow of the fluid, the auxiliary duct opening into said main duct, wherein said mobile flap moves between the closed position for preventing communication between the two ducts and an open position that allows communication between said ducts at a fluid passage aperture, said opening in the single seal allowing the fluid to pass from one of the main duct or the auxiliary duct into the other of the main duct or the auxiliary duct.

6. The valve as claimed in claim 5, wherein said first wing allows closure of said passage aperture when the mobile flap is in the closed position, and said second wing allows closure of said main duct at least partially when the mobile flap is in the open position, said first wing being said shutoff wing and said second wing being said other wing.

7. The valve as claimed in claim 6, wherein said single seal has a blind zone situated facing said other wing when the mobile flap is in the closed position.

8. The valve as claimed in claim 7, wherein said body comprises a housing for a flap actuating motor, said body being configured to define an air gap between said blind zone of the single seal and said housing.

9. The valve as claimed in claim 7, wherein the blind zone of the single seal is a portion through which the fluid cannot pass through.

10. The valve as claimed in claim 1, wherein the valve comprises a body defining a fluid flow duct, wherein said mobile flap moves between said closed position to prevent the circulation of the fluid in the fluid flow duct, and an open position allowing the fluid to circulate in the duct, wherein said single seal is positioned transversely to said fluid flow duct so that said opening in the single seal allows the fluid to pass along the fluid flow duct, when the mobile flap is in the open position.

11. The valve as claimed in claim 10, wherein said opening extends facing the shutoff wing and said other wing when the mobile flap is in the closed position.

12. The valve as claimed in claim 10, wherein the single seal is held in said body by a sleeve.

13. The valve as claimed in claim 1, wherein the surface and the opposite surface of the planar zone are planar in shape such that the planar zone of the single seal is planar in shape.

14. A fluid circulation valve comprising:
a mobile flap equipped with a first wing and with a second wing, wherein one of the first wing or the second wing is referred to as the shutoff wing, and the other of the first wing or the second wing is referred to as the other wing;
a single seal, said single seal having an opening for the passage of the fluid; and
a body defining a main duct and an auxiliary duct for the flow of the fluid, the auxiliary duct opening into said main duct, wherein said mobile flap moves between a closed position for preventing communication between the two ducts and an open position that allows communication between said ducts at a fluid passage aperture, said opening in the single seal allowing the fluid to pass from one of the main duct or the auxiliary duct into the other of the main duct or the auxiliary duct,
wherein said first wing allows closure of said passage aperture when the mobile flap is in the closed position, and said second wing allows closure of said main duct at least partially when the mobile flap is in the open position, said first wing being said shutoff wing and said second wing being the other wing,
wherein said shutoff wing is provided on one side of the single seal and said other wing is provided on the other side of the single seal when the mobile flap is in the closed position,
wherein said mobile flap comprises an intermediate zone connecting said first wing and said second wing,
wherein the intermediate zone passes through said opening in the single seal,
wherein said single seal comprises a planar zone, the planar zone of the single seal comprising:
a surface against which a planar bearing face of said shutoff wing comes to bear when the mobile flap is in the closed position; and
an opposite surface against which a planar bearing face of the other wing comes to bear when the mobile flap is in the closed position,
wherein said opening for the passage of the fluid provided in the single seal is positioned in the region of said planar zone,
wherein said bearing face of the shutoff wing and said bearing face of the other wing extend in two parallel planes distant from one another by a dimension corresponding to the thickness of only the single seal in said planar zone,
wherein when the mobile flap is in the closed position, the fluid passes through the main duct,
wherein the mobile flap rotates about a pivot shaft, and
wherein the parallel planes of the bearing face of the shutoff wing and the bearing face of the other wing do not intersect the shaft.

15. The valve as claimed in claim 14, wherein the surface and the opposite surface of the planar zone are planar in shape such that the planar zone of the single seal is planar in shape.

* * * * *